US011131060B2

(12) United States Patent
Wanibuchi

(10) Patent No.: US 11,131,060 B2
(45) Date of Patent: Sep. 28, 2021

(54) SKIN MATERIAL

(71) Applicant: SEIREN CO., LTD., Fukui (JP)

(72) Inventor: Yusuke Wanibuchi, Fukui (JP)

(73) Assignee: SEIREN CO., LTD.

( * ) Notice: Subject to any disclaimer, the term of this patent is extended or adjusted under 35 U.S.C. 154(b) by 0 days.

(21) Appl. No.: 16/760,563

(22) PCT Filed: Oct. 31, 2019

(86) PCT No.: PCT/JP2019/042732
§ 371 (c)(1),
(2) Date: Apr. 30, 2020

(87) PCT Pub. No.: WO2021/029087
PCT Pub. Date: Feb. 18, 2021

(65) Prior Publication Data
US 2021/0040683 A1 Feb. 11, 2021

(30) Foreign Application Priority Data
Aug. 9, 2019 (JP) .............................. JP2019-148103

(51) Int. Cl.
*D06N 3/18* (2006.01)
*B32B 3/26* (2006.01)
(Continued)

(52) U.S. Cl.
CPC ............. *D06N 3/186* (2013.01); *B32B 3/266* (2013.01); *B32B 5/26* (2013.01); *B32B 9/025* (2013.01);
(Continued)

(58) Field of Classification Search
None
See application file for complete search history.

(56) References Cited

U.S. PATENT DOCUMENTS 8,334,225 B2 * 12/2012 Uemura .................. B32B 5/026
442/304
2011/0200807 A1 8/2011 Shofner et al.
(Continued)

FOREIGN PATENT DOCUMENTS

CN 102877318 A 1/2013
CN 106715122 A 5/2017
(Continued)

OTHER PUBLICATIONS https://patents.google.com/patent/JP2013023646A/en?oq= JP2013023646 (Year: 2011).*
(Continued)

*Primary Examiner* — Arti Singh-Pandey
(74) *Attorney, Agent, or Firm* — Lerner, David, Littenberg, Krumholz & Mentlik, LLP

(57) ABSTRACT

In a skin material, a front face of a first fibrous base material is a first color and a front face of a second fibrous base material is a second color. The second fibrous base material is laminated on a back face of the first fibrous base material. A through hole of the first fibrous base material penetrates the first fibrous base material in a laminating direction. A dimension of the through hole in a first direction is set to a first value (N1). A dimension of the through hole in a second direction is set to a second value (N2). A dimension of the through hole in the laminating direction is set to a third value (N3). The first value (N1) and the second value (N2) are set to be 0.38 times or more and 12 times or less with respect to the third value (N3).

15 Claims, 5 Drawing Sheets

(51) Int. Cl.
*B32B 5/26* (2006.01)
*B32B 9/02* (2006.01)
*B32B 27/12* (2006.01)
*B32B 27/20* (2006.01)
*D06N 3/00* (2006.01)

(52) U.S. Cl.
CPC ............ *B32B 27/12* (2013.01); *B32B 27/20* (2013.01); *D06N 3/0054* (2013.01); *B32B 2307/4026* (2013.01); *D06N 2209/0823* (2013.01); *D06N 2211/28* (2013.01); *D06N 2213/04* (2013.01)

(56) References Cited

U.S. PATENT DOCUMENTS

| | | |
|---|---|---|
| 2012/0081441 A1 | 4/2012 | Miyake et al. |
| 2014/0247298 A1 | 9/2014 | Tabayashi |
| 2017/0266913 A1 | 9/2017 | Kaneko et al. |
| 2017/0305126 A1 | 10/2017 | Takeshita et al. |
| 2018/0164614 A1 | 6/2018 | Ikeno |
| 2018/0272781 A1 | 9/2018 | Takahashi et al. |
| 2018/0274087 A1 | 9/2018 | Takahashi et al. |

FOREIGN PATENT DOCUMENTS

| | | |
|---|---|---|
| GB | 2448611 A | 10/2008 |
| JP | H0170856 U | 5/1989 |
| JP | H0745314 Y2 | 10/1995 |
| JP | H11256483 A | 9/1999 |
| JP | 200887167 A | 4/2008 |
| JP | 2009262393 A | 11/2009 |
| JP | 5465145 B2 | 4/2014 |
| JP | 2014168851 A | 9/2014 |
| JP | 5784159 B2 | 9/2015 |
| JP | 2017119252 A | 7/2017 |
| JP | 201897190 A | 6/2018 |
| JP | 6372036 B2 | 8/2018 |
| JP | 2018162448 A | 10/2018 |
| JP | 6667057 B1 | 2/2020 |

OTHER PUBLICATIONS https://patents.google.com/patent/WO2019004063A1/en?oq=20200130337 (Year: 2017).*
International Search Report for Application No. PCT/JP2019/042732 dated Dec. 17, 2019, 2 pages.
Japanese Decision to Grant for Application No. 2019563901 dated Feb. 13, 2020, 3 pages.
Japanese Office Action for Application No. 2019563901 dated Dec. 18, 2019, 3 pages.
PCT Request submission for PCT application claiming the benefit of the priority date of JP Appl. No. 2019-148103. The PCT request was filed Oct. 31, 2019 and was assigned Application No. PCT/JP2019/042732, 6 pages.
Takeda T, Shigami K, Shimada A, Ohki K. A study of discoloration of the gingiva by artificial crowns. International Journal of Prosthodontics. Mar. 1, 1996;9(2).
Colorimetry CI. Publication CIE 15: 2004. Vienna, Austria: Commission Internationale De L'eclairage. 2004. 3rd Ed., ISBN: 3 901 906 33 9.

* cited by examiner

SKIN MATERIAL

CROSS-REFERENCE TO RELATED APPLICATIONS

This application is a national phase entry under 35 U.S.C. § 371 of International Application No. PCT/JP2019/042732 filed Oct. 31, 2019, which claims the priority from Japanese Patent Application No. 2019-148103 filed in the Japanese Patent Office on Aug. 9, 2019, the entire contents of which are hereby incorporated by reference herein.

BACKGROUND

Techniques for skin materials have been proposed. For example, patent document 1 discloses a skin. The skin is used, for example, for bags, clothes, shoes or belts. The skin is made of a skin member. The skin member is, for example, leathers or artificial leathers. In the skin member, convex-concave patterns and through holes are provided. The through holes are provided according to the shape of the convex-concave pattern. The skin includes a sheet-like body on the back side of the skin member. The sheet-like body is different in color or material from the front face of the skin member.

One example of a skin material is found in microfilm of Japanese Utility Model Application No. 62-165174 (Japanese Unexamined Utility Model Application Publication No. 01-70856).

SUMMARY OF INVENTION

A skin material forms the surface of various products. A person who sees the product visually recognizes the skin material. Therefore, there is a need to optimize the design properties of the skin material to enhance visualization.

The present invention relates to a skin material. An object of the present invention is to provide a skin material excellent in design properties.

One aspect of the present invention is a skin material including: a first fibrous base material whose front face is a first color, and a second fibrous base material whose front face is a second color different from the first color and is laminated on a back face of the first fibrous base material, wherein the first fibrous base material has a through hole penetrating the first fibrous base material in a laminating direction of the first fibrous base material and the second fibrous base material, wherein a dimension of the through hole in a first direction orthogonal to the laminating direction is set to a first value, wherein a dimension of the through hole in a second direction orthogonal to both the laminating direction and the first direction is set to a second value, wherein a dimension of the through hole in the laminating direction is set to a third value, wherein the first value is set to be 0.38 times or more and 12 times or less with respect to the third value, wherein the second value is set to be 0.38 times or more and 12 times or less with respect to the third value. The second value may be set equal to the first value.

According to the above[ ] described skin material, a portion of the front face of the second fibrous base material that overlaps with the through hole of the first fibrous base material can be exposed on the front face of the skin material. A person who sees the front face of the skin material can visually recognize the previously described portion on the front face of the second fibrous base material.

Each of the first color and the second color may be defined by color values in the L*a*b* color system, a color display method standardized by the International Commission on Illumination (CIE 1976) and also specified in JIS (JIS Z 8781-4). Under the L*a*b* color system, L*a*b* is a complete numerical descriptor of a color, where L* represents lightness while a* and b* represent chromaticity including color phase (hue) and color saturation (intensity). The second color may be different from the first color by having a ΔE*ab value set to 1.2 or more relative to the first color when both first and second colors are defined by color values in the L*a*b* color system. ΔE*ab represents a total color difference between two L*a*b* values.

According to this configuration, the person who sees the front face of the skin material can perceive the color difference between the front face of the first fibrous base material and the front face of the second fibrous base material through the through hole of the first fibrous base material.

According to the present invention, a skin material excellent in design properties can be obtained.

DETAILED DESCRIPTION

Figure 1:
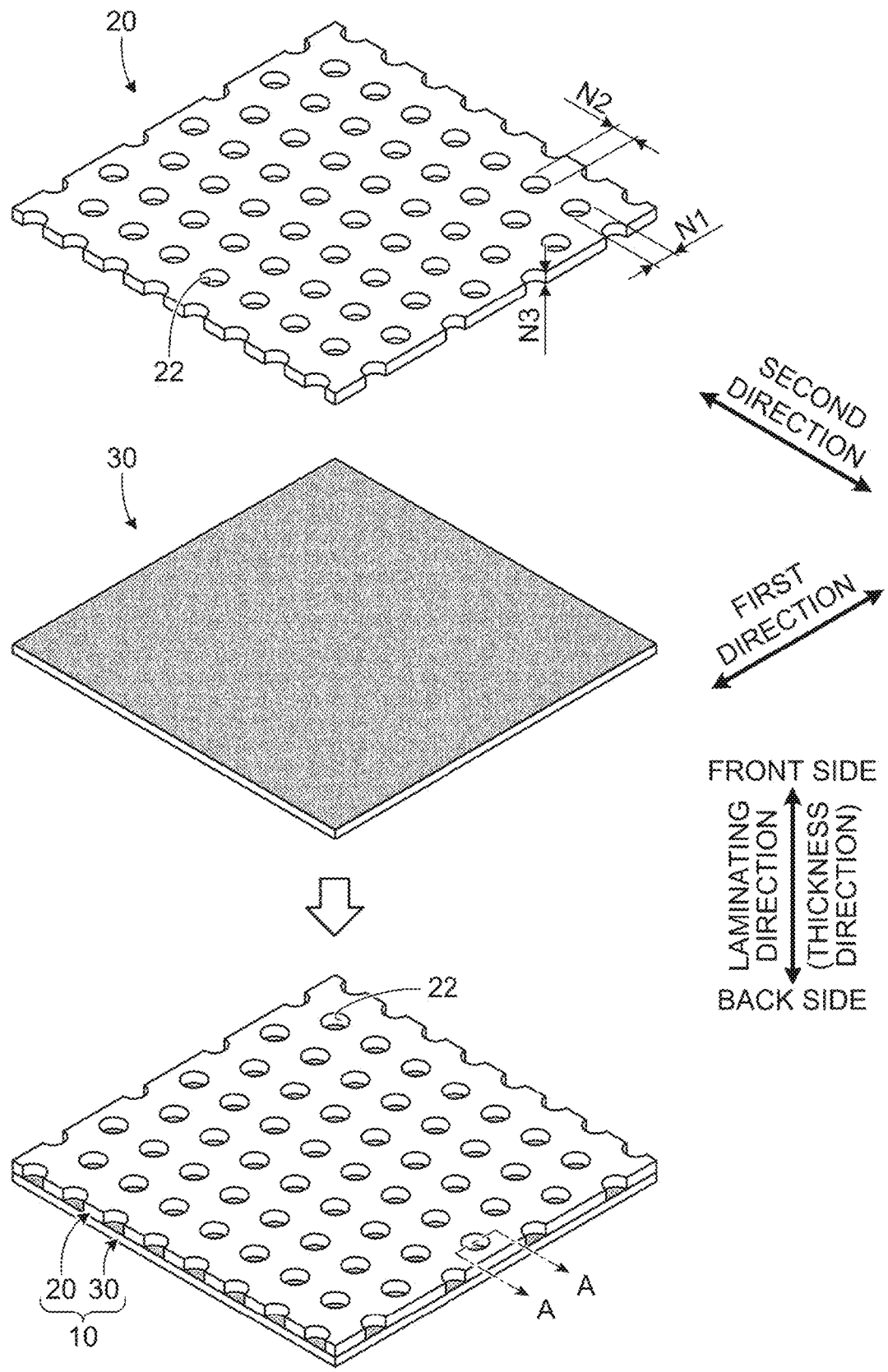
FIG. 1 is a perspective view which shows an example of a schematic structure of a first fibrous base material, a second fibrous base material and a skin material. The upper row shows the first fibrous base material. The middle row shows the second fibrous base material. The lower row shows the skin material.

Embodiments for carrying out the present invention will be described with reference to the drawings. The present invention is not limited to the configurations described below, and various configurations can be employed based on the same technical idea. For example, a part of the configurations shown below may be omitted or may be replaced by another configuration or the like. The present invention may include another configuration. The drawings schematically show a predetermined configuration. Therefore, in each drawing, correspondence with another drawing or correspondence with a numerical value which will be described later specifying the configuration in the drawing may not be accurate in some cases. Hatching indicates a cut surface. The broken line is a hidden line.

<Skin Material>

A skin material 10 will be described with reference to FIG. 1. The skin material 10 is provided on a surface of a predetermined product or component. For example, the skin material 10 is vehicle interior skin materials. For example, the vehicle interior skin materials include a seat skin material, a ceiling skin material, a door skin material and a floor skin material. When the skin material 10 is a seat skin material, the skin material 10 is provided on the surface of the seat. The skin material 10 can also be employed as a vehicle interior skin material provided on a surface of the following vehicle interior components. Examples of the previously described vehicle interior components include an instrument panel, a center console and a glove compartment. The skin material 10 can be used as a material for furniture, covers and bags. Examples of furniture include sofas and chairs. Examples of covers include seat covers.

The skin material 10 can be used as a material for architectural interiors. Example of architectural interior materials include cloths. However, the previously described products or components are examples. The skin material 10 can be employed as a material of various products or components.

Figure 2:
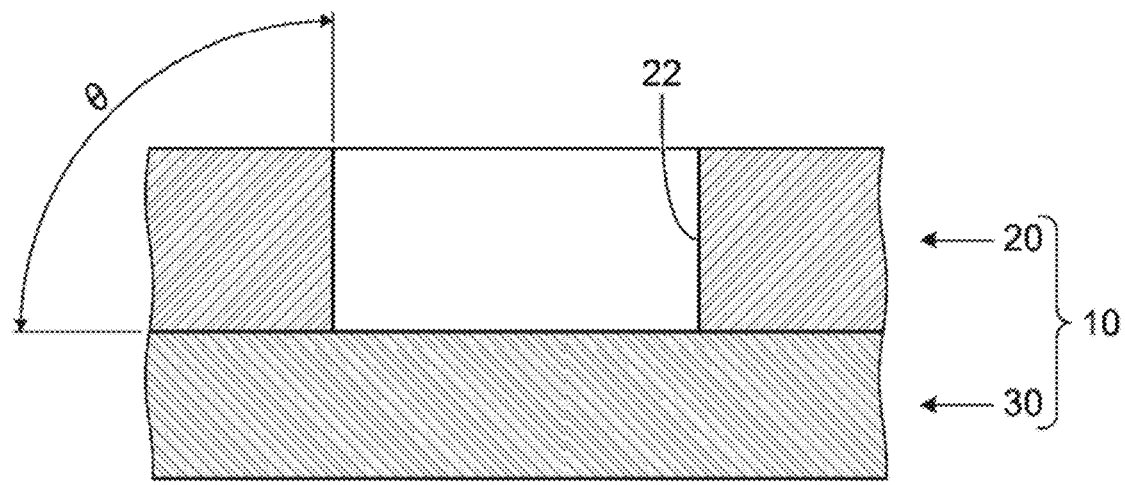
FIG. 2 is a cross sectional view taken along the line A-A in the lower row of FIG. 1. It shows a through hole of the first fibrous base material.
Figure 3:
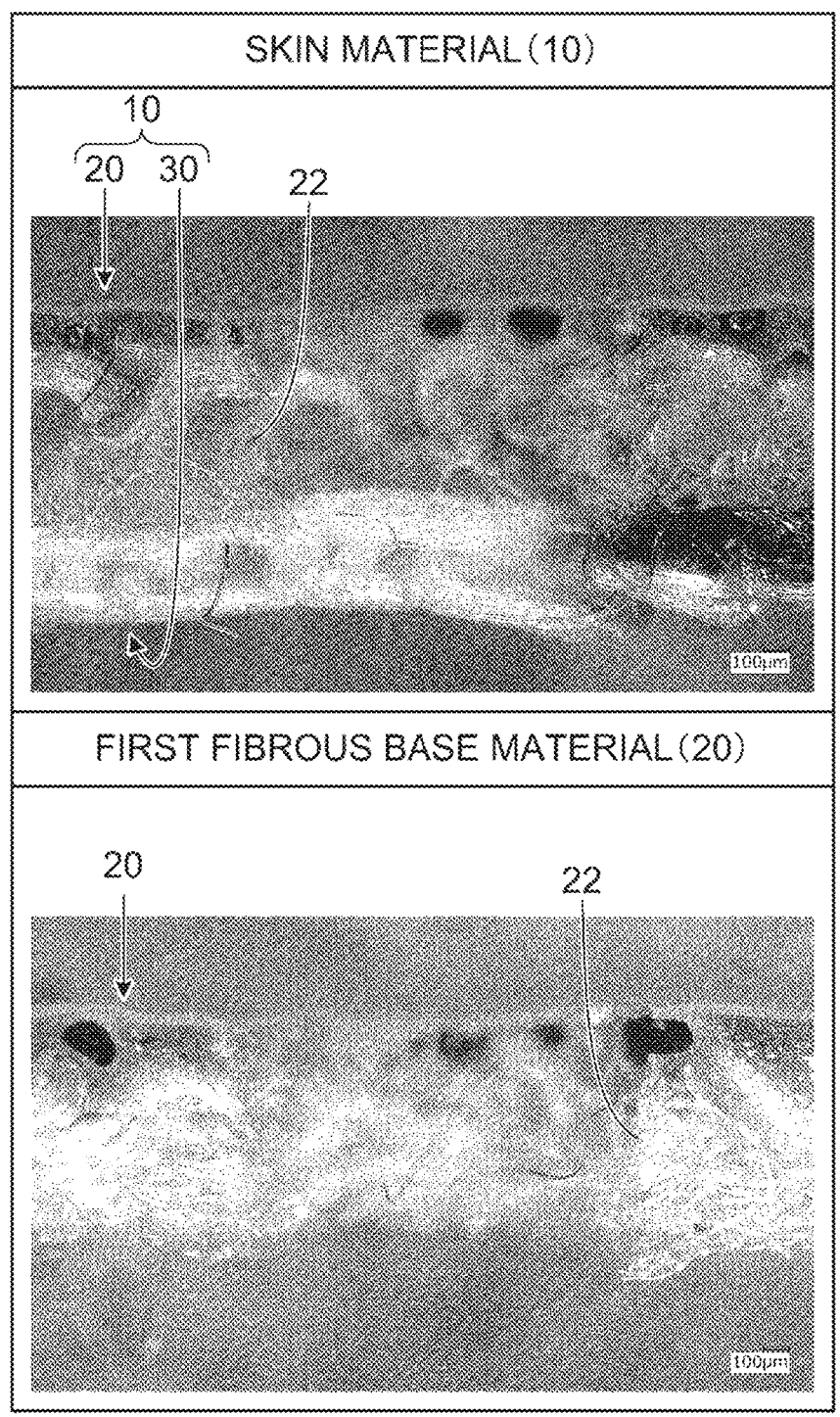
FIG. 3 is a cross sectional photograph of the through hole of the first fibrous base material. The upper row shows a state of the skin material. The lower row shows a state of the first fibrous base material alone.

The skin material 10 includes a first fibrous base material 20 and a second fibrous base material 30. The second fibrous base material 30 is laminated on a back face of the first fibrous base material 20. The second fibrous base material 30 is bonded to the back face of the first fibrous base material 20. In other words, the first fibrous base material 20 is laminated on a front face of the second fibrous base material 30 and is bonded to the front face of the second fibrous base material 30 with its back face. The description of an adhesive used for bonding the first fibrous base material 20 and the second fibrous base material 30 will be described later. In the lower row of FIG. 1 and FIG. 2 which will be described later, the illustration of the following bonded portion is omitted. The previously described bonded portion is formed by the adhesive cured between the first fibrous base material 20 and the second fibrous base material 30. In the upper row of FIG. 3 which will be described later, this bonded portion cannot be visually recognized.

A front face of the first fibrous base material 20 becomes a front face of the skin material 10, and a back face of the second fibrous base material 30 becomes a back face of the skin material 10. In the embodiment, a direction in which the first fibrous base material 20 and the second fibrous base material 30 are laminated is referred to as a "laminating direction". The laminating direction matches a thickness direction of the skin material 10, the first fibrous base material 20 and the second fibrous base material 30. One side in the laminating direction in which the first fibrous base material 20 is provided on the skin material 10 is referred to as a "front side", and the other side in the laminating direction in which the second fibrous base material 30 is provided on the skin material 10 is referred to as a "back side". In the skin material 10, the first fibrous base material 20 and the second fibrous base material 30, the front face is a surface on the front side in the laminating direction, and the back face is a surface on the back side in the laminating direction.

The first fibrous base material 20 and the second fibrous base material 30 are sheet-like materials. The first fibrous base material 20 has a plurality of through holes 22. Therefore, the skin material 10 is a sheet-like laminated body having a plurality of through holes 22 on the front face. The description regarding the through holes 22 will be described later. In the embodiment, a direction orthogonal to the laminating direction is referred to as a "first direction". A direction orthogonal to both the laminating direction and the first direction is referred to as a "second direction". For example, in the following case, the first direction and the second direction are directions orthogonal to each other in a horizontal plane. The previously described case is a case in which the skin material 10 is spread horizontally with the laminating direction being the vertical direction. The skin material 10 has a rectangular shape in which two sides along the first direction are parallel and two sides along the second direction are parallel. However, the outer shape of the skin material 10 is appropriately determined in consideration of various conditions.

The first fibrous base material 20 has a first color front face. The second fibrous base material 30 has a second color front face. The second color is different from the first color. For the second color, the $\Delta E^*ab$ value relative to the first color when both colors are defined in the $L^*a^*b^*$ color system is set to 1.2 or more.

Hereinafter, the first fibrous base material 20, the second fibrous base material 30 and, the adhesive and a method for manufacturing the skin material 10 will be described.

<First Fibrous Base Material>

Various fibrous base materials can be employed as the first fibrous base material 20. The fibrous base material employed as the first fibrous base material 20 is appropriately determined according to the product in which the skin material 10 is used. However, the inventor considers that the first fibrous base material 20 is preferably a leather member from various viewpoints. Examples of the leather member include natural leather, synthetic leather, artificial leather, synthetic resin films and synthetic resin sheets. The front face of the synthetic resin film and the synthetic resin sheet as the leather member includes a convex-concave pattern formed by embossing. An example of the convex-concave pattern is a leather-like grain pattern. Natural leather includes split leather. Examples of synthetic leather include polyurethane leather and polyvinyl chloride leather. In the embodiment, the first fibrous base material 20 is assumed to be a leather member.

It is preferable that a thickness of the first fibrous base material 20 is set to a predetermined value in a range of 0.2 to 1.6 mm. More preferably, the thickness of the first fibrous base material 20 is set to a predetermined value in the range of 0.6 to 1.4 mm. Much more preferably, the thickness of the first fibrous base material 20 is set to a predetermined value in the range of 0.8 to 1.2 mm.

The through holes 22 provided to the first fibrous base material 20 penetrate the first fibrous base material 20 in the laminating direction. The processing of the through holes 22 to the first fibrous base material 20 is performed by a known processing method. For example, the through hole 22 is formed by needle punching, electric discharge machining, or laser machining. Description of the processing of the through holes 22 to the first fibrous base material 20 is omitted.

A dimension of the through hole 22 in the first direction is set to a first value N1. A dimension of the through hole 22 in the second direction is set to a second value N2. A dimension of the through hole 22 in the laminating direction is set to a third value N3. It is preferable that the first value N1 is set to a predetermined value in a range of 0.6 to 2.4 mm. More preferably, the first value N1 is set to a predetermined value in the range of 0.8 to 2.0 mm. It is preferable that the second value N2 is set to a predetermined value in a range of 0.6 to 2.4 mm. More preferably, the second value N2 is set to a predetermined value in the range of 0.8 to 2.0 mm. It is preferable that the third value N3 is set to a predetermined value in a range of 0.2 to 1.6 mm. In this case, the first value N1 is set to be 0.38 times (0.6÷1.6) or more and 12 times (2.4÷0.2) or less with respect to the third value N3. The second value N2 is set to be 0.38 times (0.6÷1.6) or more and 12 times (2.4÷0.2) or less with respect to the third value N3.

In the embodiment, the third value N3 matches the dimension of the first fibrous base material 20 in the laminating direction (the thickness of the first fibrous base material 20). The plurality of through holes 22 are circular through holes when the skin material 10 is viewed from the front side in the laminating direction, and have the same shape. In this case, the first value N1 becomes the same value as the second value N2, and the first value N1 and the second value N2 are the diameters of the through holes 22. By forming the through holes 22 in circular, a durability of the first fibrous base material 20 can be improved. However, the planar shape of the through hole 22 when the skin material 10 is viewed from the front side in the laminating direction may be different from a circular shape. For example, the planar shape of the through hole 22 may be a polygonal shape of a triangle or more, an ellipse or an irregular shape. In this case, the second value N2 may be different from the first value N1. The planar shape of the through hole 22 is appropriately determined in consideration of various conditions.

Assuming that the planar shape of the through hole 22 is circular, and the first value N1 and the second value N2 are set to predetermined values in a range of 0.6 to 2.4 mm. In this case, an opening area of the through hole 22 is 0.28 ($\pi \times 0.6^2 \div 4$) to 4.52 ($\pi \times 2.4^2 \div 4$) mm$^2$. Unlike the embodiment, assuming that the planar shape of the through hole 22 is a square, and the first value N1 and the second value N2 are set to predetermined values in the range of 0.6 to 2.4 mm. In this case, the opening area of the through hole 22 is 0.36 ($0.6^2$) to 5.76 ($2.4^2$) mm$^2$.

It is preferable that an inclination angle θ of an inner wall of the through hole 22 is set to a predetermined value in the range of 84 to 90°. The inclination angle θ is an angle between the back face of the first fibrous base material 20 and the inner wall of the through hole 22 (see FIG. 2). When the inclination angle θ is less than 90°, the dimension of the through hole 22 in the first direction described above is a dimension of the through hole 22 in the first direction on the front side in the laminating direction, the dimension of the through hole 22 in the second direction described above is a dimension of the through hole 22 in the second direction on the front side in the laminating direction, and the opening area of the through hole 22 described above is an opening area of the through hole 22 on the front side in the laminating direction.

An aperture ratio of the plurality of through holes 22 is preferably set to a predetermined value in the range of 2.77 to 14.26%. More preferably, the aperture ratio of the plurality of through holes 22 is set to a predetermined value in the range of 10.5 to 14.26%. The aperture ratio of the plurality of through holes 22 is a ratio of a total area of the plurality of through holes 22 to a unit area. The total area of the plurality of through holes 22 is a sum of the opening areas of all of the through holes 22 existing in the unit area of the first fibrous base material 20.

By providing the through hole 22 having the above-described shape in the first fibrous base material 20 as described above, a durability of the skin material 10 can be improved, and a tear strength of the skin material 10 can be increased. The tear strength is a maximum load when the skin material 10 is cut by tearing. The method for measuring the tear strength will be described later.

An arrangement of the plurality of through holes 22 in the first direction and the second direction is appropriately determined in consideration of various conditions. For example, in the skin material 10 of FIG. 1, the arrangement of the plurality of through holes 22 is as the following aspect. The previously described aspect is an aspect in which a plurality of rows of through holes are arranged in the first direction while being shifted by a predetermined amount in the second direction. One through hole row is formed by arranging a predetermined number of through holes 22 in the second direction. In the previously described aspect, when any two through hole rows adjacent in the first direction are targeted, the through holes 22 forming the two through hole rows are arranged in a staggered manner. However, such arrangement of the plurality of through holes 22 is an example. The arrangement of the plurality of through holes 22 may be different from the previously described aspect (see the upper and lower rows in FIG. 1). For example, the arrangement of the plurality of through holes 22 may be in a geometrical aspect.

<Second Fibrous Base Material>

Various fibrous base materials can be employed as the second fibrous base material 30. The fibrous base material employed as the second fibrous base material 30 is appropriately determined according to the product in which the skin material 10 is used. However, the inventor considers that the second fibrous base material 30 is preferably a knitted fabric from various viewpoints. Examples of the knitted fabric include a circular knitted fabric, a tricot knitted fabric, a single raschel knitted fabric and a double raschel knitted fabric. The inventor considers that either the circular knitted fabric or the tricot knitted fabric is preferable among the previously described knitted fabrics. The circular knitted fabrics and the tricot knitted fabrics can reduce the thickness and reduce the density. Furthermore, the circular knitted fabrics and the tricot knitted fabrics have good air permeability. In addition, the circular knitted fabrics and the tricot knitted fabrics are relatively inexpensive. In the embodiment, the second fibrous base material 30 is assumed to be a knitted fabric.

Various fibers can be employed as the fiber used as the material of the second fibrous base material 30. Examples of the previously described fibers include natural fibers, regenerated fibers, synthetic fibers and semi-synthetic fibers. The second fibrous base material 30 can be made of one or more kinds of fibers selected from a group including a plurality of fibers previously described. However, the inventor considers that synthetic fibers are preferable. Furthermore, the inventor considers that among synthetic fibers, polyester fibers are preferable.

A cross sectional shape of the fiber used as the material of the second fibrous base material 30 is appropriately determined in consideration of various conditions. For example, the previously described cross sectional shape may be any of a round shape and an irregular shape. Examples of irregular shape include a flat shape, an elliptical shape, a triangular, hollow shape, Y-shaped, T-shaped and U-shaped.

A yarn of the fiber used as the material of the second fibrous base material 30 is appropriately determined in consideration of various conditions. For example, the previously described yarn may be any of a filament yarn (long fiber yarn) and a spun yarn (short fiber yarn). The filament yarn may be a multifilament yarn. The multifilament yarn may be twisted, and may have one or both of crimpability and bulkiness. For example, crimpability and bulkiness can be imparted by false twisting or fluid disturbance processing. Examples of the fluid disturbance processing include a taslan processing and an interlace processing.

A single fiber fineness of the fiber used as the material of the second fibrous base material 30 is preferably set to a predetermined value in the range of 0.5 to 10 dtex. By setting the single fiber fineness to 0.5 dtex or more, the durability of the skin material 10 can be improved, and the tear strength of the skin material 10 can be increased. By setting the single fiber fineness to 10 dtex or less, it is possible to prevent the elongation characteristics of the skin material 10 from decreasing.

It is preferable to set the fineness of the yarn of the fiber used as the material of the second fibrous base material 30 to a predetermined value in the range of 24 to 330 dtex. By setting the fineness of the yarn to 24 dtex or more, the durability of the skin material 10 can be improved, and the tear strength of the skin material 10 can be increased. By setting the fineness of the yarn to 330 dtex or less, it is possible to prevent the elongation characteristics of the skin material 10 from decreasing.

A density of the second fibrous base material 30 is preferably set to a predetermined value in a range of 30 to 65 course/25.4 mm, and is preferably set to a predetermined value in a range of 25 to 55 wale/25.4 mm. By setting the density to 30 course/25.4 mm or more and 25 wale/25.4 mm or more, the durability of the skin material 10 can be improved, and the tear strength of the skin material 10 can be increased. Furthermore, by setting the density to 30 course/25.4 mm or more and 25 wale/25.4 mm or more, when the skin material 10 is viewed from the front side in the laminating direction, the front face of the second fibrous base material 30 can be easily visually recognized through the through holes 22. By setting the density to 65 course/25.4 mm or less and 55 wale/25.4 mm or less, it is possible to prevent the elongation characteristics of the skin material 10 from decreasing.

A thickness of the second fibrous base material 30 is preferably set to a predetermined value in the range of 0.3 to 1.0 mm. By setting the thickness to 0.3 mm or more, the durability of the skin material 10 can be improved, and the tear strength of the skin material 10 can be increased. By setting the thickness to 1.0 mm or less, it is possible to prevent the elongation characteristics of the skin material 10 from decreasing.

An aperture ratio of the second fibrous base material 30 is preferably set to a predetermined value in the range of 0.47 to 80.63%. More preferably, the aperture ratio of the second fibrous base material 30 is set to a predetermined value in the range of 13.55 to 48.77%. When the second fibrous base material 30 is a knitted fabric, a gap (through hole) which communicates from the front face to the back face is formed between the hooked yarns in the second fibrous base material 30. The aperture ratio of the second fibrous base material 30 is a ratio of a total area of the gap to a unit area. The total area of the gap is a sum of the opening areas of all of the gaps existing in the unit area of the second fibrous base material 30.

By setting the opening ratio of the second fibrous base material 30 to 0.47% or more, it is possible to prevent the elongation characteristics of the skin material 10 from decreasing. By setting the opening ratio of the second fibrous base material 30 to 80.63% or less, the durability of the skin material 10 can be improved, and the tear strength of the skin material 10 can be increased. Furthermore, when the skin material 10 is viewed from the front side in the laminating direction, the front face of the second fibrous base material 30 can be easily visually recognized through the through holes 22.

<Adhesive and Method for Manufacturing Skin Material>

Various adhesives can be employed as the adhesive. Examples of adhesives that can be employed include polyurethane adhesives, acrylic adhesives, vinyl chloride adhesives, and silicone adhesives. However, the inventor considers that polyurethane adhesives are preferable from the viewpoint of texture. The inventor considers that among the polyurethane adhesives, a one-component polyurethane adhesive is preferable from the viewpoint of process load, and a hot-melt type is more preferable.

The method for manufacturing the skin material 10 includes a first step and a second step. The first step is a step of applying the adhesive. The adhesive can be applied to one or both of the back face of the first fibrous base material 20 and the front face of the second fibrous base material 30. However, the inventor considers that the adhesive is preferably applied to the back face of the first fibrous base material 20. By applying the adhesive to the back face of the first fibrous base material 20, the entering of the adhesive into the through holes 22 can be reduced. It is possible to prevent the appearance quality of the skin material 10 from deteriorating on the front side in the laminating direction.

As a method of applying the adhesive, a known method can be employed. Examples of the applying method include a spray coating method, a knife coating method, a roll coating method and a T-die method. An example of the roll coating method includes a gravure method.

An application amount of the adhesive is preferably set to a predetermined value in the range of 20 to 40 $g/m^2$. By setting the application amount of the adhesive to 20 $g/m^2$ or more, the durability of the skin material 10 can be improved, and a peeling strength between the first fibrous base material 20 and the second fibrous base material 30 can be ensured. By setting the application amount of the adhesive to 40 $g/m^2$ or less, it is possible to prevent the texture of the skin material 10 from becoming hard.

An application range of the adhesive may be the entire back face of the first fibrous base material 20, or may be a part of the back face of the first fibrous base material 20. When the application range of the adhesive is a part of the back face of the first fibrous base material 20, it is preferable that the application position of the adhesive is uniformly distributed on the back face of the first fibrous base material 20. In this case, for example, the adhesive is preferably applied to the back face of the first fibrous base material 20 in the form of dots, stripes or a lattice. Along with this, the durability of the skin material 10 can be improved, and the peeling strength between the first fibrous base material 20 and the second fibrous base material 30 can be ensured.

When the application range of the adhesive is a part of the back face of the first fibrous base material 20, an application area ratio of the adhesive is preferably set to a predetermined value in the range of 5 to 20%. The application area ratio is a ratio of the application area of the adhesive to an area of the back face of the first fibrous base material 20. Regarding the application area ratio, the area of the back face of the first fibrous base material 20 does not include the opening area of the through holes 22 on the back side in the laminating direction. By setting the application area ratio of the adhesive to 5% or more, the durability of the skin material 10 can be improved, and the peeling strength between the first fibrous base material 20 and the second fibrous base material 30 can be ensured. By setting the application area ratio of the adhesive to 20% or less, it is possible to prevent the texture of the skin material 10 from becoming hard.

An outline of an example of a method of measuring the application area ratio will be described. This measurement method targets the skin material 10 as a finished product. First, the second fibrous base material 30 is peeled from the skin material 10 to obtain a single body of the first fibrous base material 20. Subsequently, the back face of the first fibrous base material 20 is imaged using a microscope. The imaging magnification is set to 100 magnifications. As a microscope, a digital microscope (VHX-5000) manufactured by Keyence© Corporation can be used. This digital microscope includes area measurement software in the software section. Then, the application area of the adhesive is measured using the area measurement software, and the application area ratio is obtained from the measured result. In the measurement of the application area, the color of the adhesive in the captured image is selected. The measurement of the application area is performed under the conditions of filling holes and removing small particles.

The second step is a step of attaching the first fibrous base material 20 and the second fibrous base material 30. The second step is preferably performed after the first step ends in a state where the adhesive has a viscous property. The second step is preferably performed by pressing the first fibrous base material 20 against the second fibrous base material 30, or preferably performed by pressing the second fibrous base material 30 against the first fibrous base material 20. The shape of the through holes 22 provided to the first fibrous base material 20 is, even if the first fibrous base material 20 is a part of the skin material 10 (see the upper row of FIG. 3), maintained in the above-described shape (see the lower row of FIG. 3) intended for the first fibrous base material 20 as a single body.

<Example>

The inventor conducted experiments on three types of samples corresponding to the skin material 10 in order to confirm the effectiveness of the skin material 10. The three types of samples are referred to as "sample 1", "sample 2" and "sample 3". In this description, to clarify the correspondence with the above, the reference numerals for the respective portions are the same as above.

<Experimental Method>

(1) Samples 1 to 3

The manufacturing method of the first fibrous base material 20 and the second fibrous base material 30 of the samples 1 to 3 and the skin material 10 as the samples 1 to 3 are as follows.

(1-1) First Fibrous Base Material

The first fibrous base material 20 is a synthetic leather in which a polyurethane resin layer and a knitted fabric are laminated. In the first fibrous base material 20 made of synthetic leather, the polyurethane resin layer is provided on the front side in the laminating direction and the knitted fabric is provided on the back side in the laminating direction. The back face of the polyurethane resin layer is adhered to the front face of the knitted fabric by the adhesive.

The polyurethane resin layer was prepared by coating a release paper with a polyurethane resin liquid to a thickness of 200 μm and then drying at 130° C. for 2 minutes. The polyurethane resin liquid was prepared by adding the following additives to the following amounts with respect to 100 pts·mass of the polycarbonate polyurethane resin. The viscosity of the polyurethane resin liquid was adjusted to about 2000 mPa·s.

[Additive for Sample 1]
Red pigment (Color Index (hereinafter "C. I.") Pigment RED 208, solid content 15 mass %): 4.98 pts·mass
Yellow pigment (C. I. Pigment BROWN 24, solid content 52.5 mass %): 2.99 pts·mass
Red pigment (C. I. Pigment RED 48: 4, solid content 10 mass %): 0.11 pts·mass
White pigment (C. I. Pigment WHITE 21, solid content 3 mass %): 0.03 pts·mass
Dimethylformamide: 40 pts·mass

[Additive for Sample 2]
Black pigment (C. I. Pigment BLACK 7, solid content 20 mass %): 2.06 pts·mass
Blue pigment (C. I. Pigment BLUE 290, solid content 52.5 mass %): 2.15 pts·mass
White pigment (C. I. Pigment WHITE 6, solid content 52.5 mass %): 2.73 pts·mass
Green pigment (C. I. Pigment GREEN 7, solid content 20 mass %): 0.06 pts·mass
Dimethylformamide: 40 pts·mass

[Additive for Sample 3]
Yellow pigment (C. I. Pigment BROWN 24, solid content 52.5 mass %): 0.84 pts·mass
Black pigment (C. I. Pigment BLACK 7, solid content 20 mass %): 0.16 pts·mass
White pigment (C. I. Pigment WHITE 6, solid content 52.5 mass %): 7.88 pts·mass
Brown pigment (C. I. Pigment YELLOW 164, solid content 52.5 mass %): 12.08 pts·mass
Dimethylformamide: 40 pts·mass The knitted fabric was the same tricot knitted fabric made of polyester fiber in samples 1 to 3. The basis weight of the knitted fabric was 220 g/m$^2$.

The adhesive was prepared by adding 50 pts·mass of dimethylformamide to 100 pts·mass of a polycarbonate polyurethane adhesive (Chrisbon TA-205) manufactured by DIC® Corporation. The viscosity of the adhesive was adjusted to about 4500 mPa·s.

When preparing the first fibrous base material 20, the adhesive was coated on the back face of the polyurethane resin layer to a thickness of 200 μm, and then the adhesive was dried at 100° C. for 1 minute. Accordingly, an adhesive layer having a thickness of 200 μm is formed on the back face of the polyurethane resin layer. Subsequently, the polyurethane resin layer and the knitted fabric were aligned, and pressure bonding using a press device under the following pressing conditions. The release paper was peeled off and the first fibrous base material 20 was obtained.

[Pressing Condition]
Pressurization time: 1 minute
Pressing force: 39.2 N/cm$^2$ Next, the prepared synthetic leather was set in a punching machine, and the plurality of through holes 22 were formed to the synthetic leather. The processing conditions for the through holes 22 were set such that the average diameter was 1.6 mm and the aperture ratio of the plurality of through holes 22 was 6.3%. The specifications of the prepared first fibrous base material 20 were as follows.

[Specification of First Fibrous Base Material 20]
Thickness: 1.2 mm
Aperture ratio of the plurality of through holes 22: 6.3%
Opening area of through holes 22: 2.01 mm$^2$
Inclination angle δ (see FIG. 2): 87°

Figure 4:
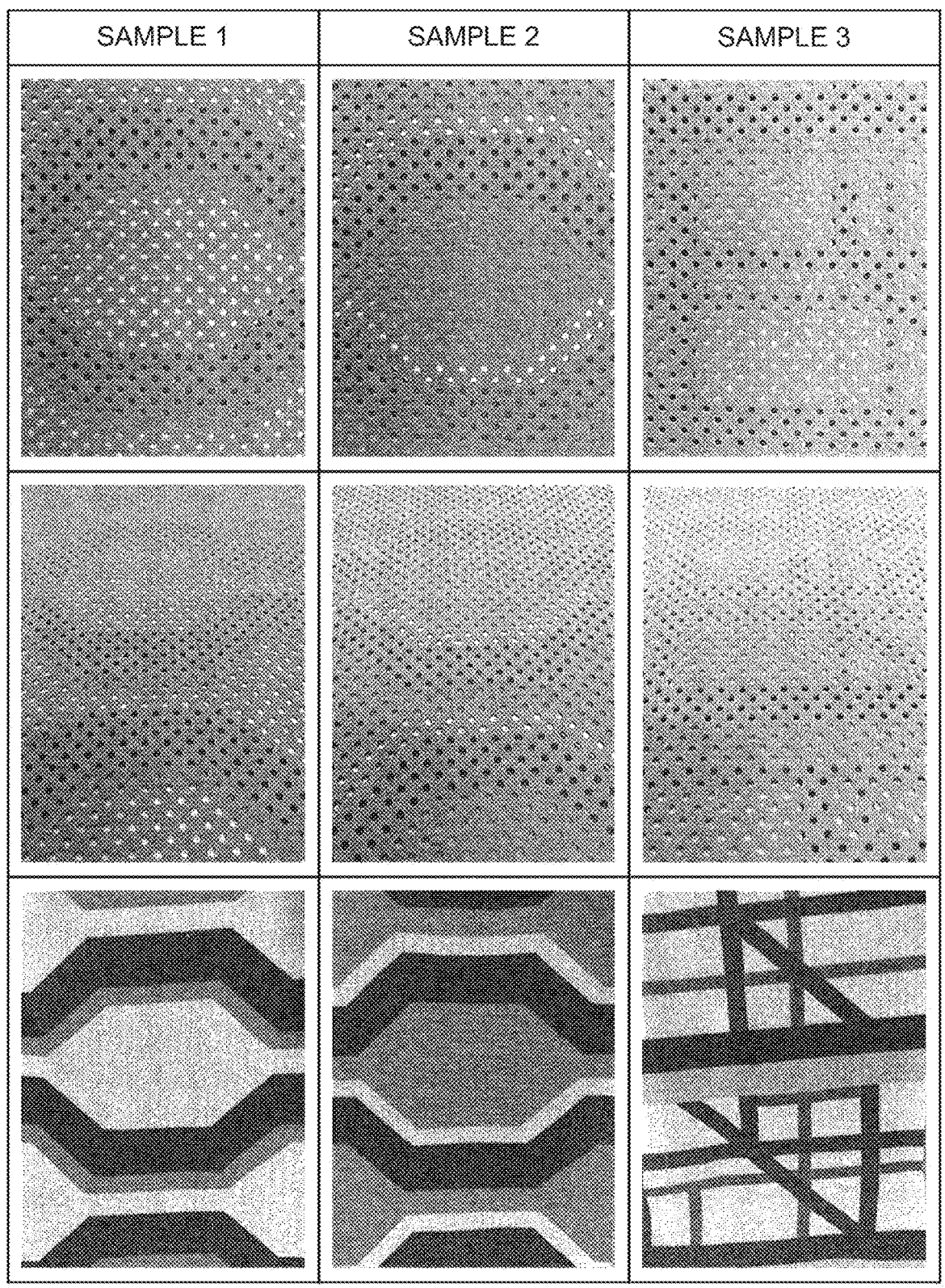
FIG. 4 is appearance photographs of samples corresponding to the skin material and the second fibrous base materials of the samples. The upper row are photographs of front faces of the samples viewed straight from a front side in a laminating direction. The middle row are photographs of the front faces of the samples viewed obliquely from the front side in the laminating direction. The lower row are photographs of front faces of the second fibrous base materials viewed straight from the front side in the laminating direction.

The difference among the first fibrous base materials 20 of the samples 1 to 3 is the color of the polyurethane resin layer (see the upper row and middle row of FIG. 4). The entire polyurethane resin layer of the first fibrous base material 20 of sample 1 is colored in the same red. The entire polyurethane resin layer of the first fibrous base material 20 of sample 2 is colored in the same dark gray. The entire polyurethane resin layer of the first fibrous base material 20 of sample 3 is colored in the same gray.

(1-2) Second Fibrous Base Material

The second fibrous base material 30 was a circular knitted fabric having the following specifications. Different geometric patterns were recorded on the front face of the circular knitted fabric for each of samples 1 to 3 (see the lower row of FIG. 4).

Figure 5:
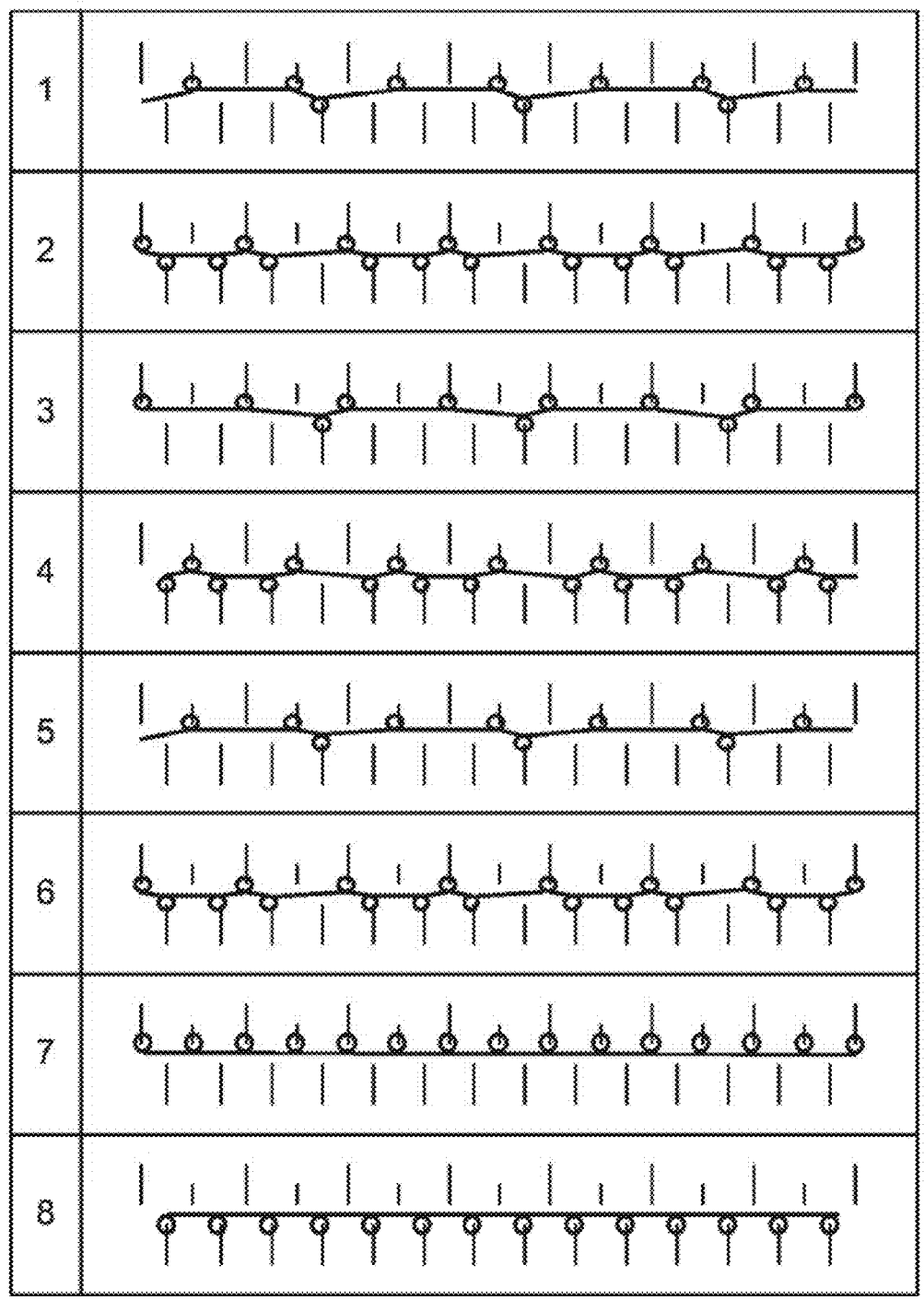
FIG. 5 is a diagram showing knitting structures of the second fibrous base materials of the samples in the lower row of FIG. 4.

[Specification of Second Fibrous Base Material 30]
Knit structure: see FIG. 5
Thread: 84 dtex/72 f polyester processed yarn (see Nos. 1, 3 and 5 in FIG. 5)
84 dtex/36 f polyester processed yarn (see Nos. 2, 4, 6 and 7 in FIG. 5)
90 dtex/48f polyester differently shrinkable combined filament yarn (see No. 8 in FIG. 5)
Density: 44 course/25.4 mm, 44 wale/25.4 mm
Thickness: 0.4 mm (1-3) Manufacturing Method of Skin Material For bonding the first fibrous base material 20 and the second fibrous base material 30, an adhesive made of a reactive hot melt polyurethane resin (NH129) manufactured by DIC Corporation was used. The adhesive was heated to 120° C.

In the first step, the adhesive was applied to the back face of the first fibrous base material 20. As an applying method, the gravure method was employed. A gravure roll used for the gravure method had the following specifications. The application amount was 40 g/m².

[Specification of Gravure Roll]
Dot diameter: 600 μm
Dot depth: 200 μm
Volume: 35 cm³/m²

In the second step, the first fibrous base material 20 and the second fibrous base material 30 were bonded with each other in a state where the adhesive applied to the back face of the first fibrous base material 20 in the first step had viscosity. With the completion of the second step, skin materials 10 as samples 1 to 3 were obtained. The pressing conditions were the same as in the case of the first fibrous base material 20 described above. In the skin materials 10 as the samples 1 to 3, the application area ratio of the adhesive was 14%.

(2) Appearance Observation

The appearance of samples 1 to 3 was visually observed. The observation directions were directions in which the front faces of the samples 1 to 3 were viewed straight from the front side in the laminating direction, and in which the front faces of the samples 1 to 3 were viewed obliquely from the front side in the laminating direction.

(3) ΔE*ab

L*, a* and b* of the front face of the first fibrous base material 20 and L*, a* and b* of the front face of the second fibrous base material 30 were measured for the samples 1 to 3, and ΔE*ab was determined from the measurement results based on the following expression (1). In expression (1), ΔL*, Δa* and Δb* are as follows. ΔL* is a difference between L* of the front face of the first fibrous base material 20 and L* of the front face of the second fibrous base material 30. Δa* is a difference between a* of the front face of the first fibrous base material 20 and a* of the front face of the second fibrous base material 30. Δb* is a difference between b* of the front face of the first fibrous base material 20 and b* of the front face of the second fibrous base material 30.

[Expression 1]

$$\Delta E^*ab = \sqrt{(\Delta L^*)^2 + (\Delta a^*)^2 + (\Delta b^*)^2} \quad (1)$$

L*, a* and b* of the front face of the first fibrous base material 20 are the average values of each of the four L*, a* and b* obtained by measuring four arbitrary points on the front face of the first fibrous base material 20. L*, a* and b* of the front face of the second fibrous base material 30 are the average values of each of the four L*, a* and b* obtained by measuring four arbitrary points on the front face of the second fibrous base material 30. However, L*, a* and b* of the front face of the second fibrous base material 30 were measured, in samples 1 and 2, at four points as the measurement targets in each white region, red region and black region included in the geometric pattern recorded on the front face of the second fibrous base material 30, and in sample 3, at four points as the measurement targets in each white region, gray region and black region included in the geometric pattern recorded on the front face of the second fibrous base material 30. For the measurement, a spectrophotometer (Color 15DV) manufactured by X-Rite Inc. was used. A light source was a C light source.

(4) Mechanical Strength

The mechanical strength of the sample 3 was measured. The differences among the samples 1 to 3 are the color of the polyurethane resin layer of the first fibrous base material 20 and the geometric pattern recorded on the front face of the second fibrous base material 30. Such a difference does not affect the mechanical strength measured in this experiment. The mechanical strength of samples 1 and 2 can be identified with the mechanical strength of sample 3. Therefore, in this experiment, as previously described, the sample 3 was set as the measurement target.

For the measurement of the mechanical strength, a tensile tester (Autograph AG-100A) manufactured by Shimadzu Corporation was used. In this tensile tester, a gripper provided on the lower side is fixed at a fixed position, and a gripper provided on the upper side moves in the vertical direction. The measurement environment was as follows.

[Measurement Environment]
Room temperature: 20±2° C.
Humidity: 65±5% RH (4-1) Tear strength For the measurement of the tear strength, a rectangular test piece having a width of 50 mm and a length of 250 mm was used. The number of the test pieces was three pieces taken from sample 3 along a warp direction of sample 3 and three pieces taken from sample 3 along a weft direction of sample 3. For example, when the second fibrous base material 30 as a knitted fabric is used as a reference, the warp direction of sample 3 matches the warp direction of the second fibrous base material 30. The weft direction of sample 3 is orthogonal to the warp direction of sample 3. The test piece includes a cut whose length is 10 mm. The cut is formed along the direction of a long side of the test piece from a center position of one short side of two short sides of the test piece to the side of the other short side.

The test piece was attached to a pair of grippers of the tensile tester with the tip end portions of two strips which was divided by the cut being turned upside down. The tip end portion of the strip is an end portion of the strip on the side of the above-described "one short side of two short sides". The measurement of the tear strength was carried out conforming to JIS L1913: 2010 6.4.2. The measurement conditions were as follows.

[Measurement Conditions]
Grip interval: 10 mm
Pulling speed: 200 mm/minute

The pulling speed is a moving speed of the gripper. The average value of the three maximum loads obtained by measuring three test pieces taken along the warp direction was defined as the tear strength of the sample 3 in the warp direction. The average value of the three maximum loads obtained by measuring three test pieces taken along the weft direction was defined as the tear strength of the sample 3 in the weft direction.

In the description regarding the mechanical strength, the warp direction of the sample 3 is simply referred to as the "warp direction", and the weft direction of the sample 3 is simply referred to as the "weft direction". The direction of the long side of the test piece taken from sample 3 is referred to as the "long side direction".

(4-2) Peeling Strength

For the measurement of the peeling strength, a rectangular test piece having a width of 30 mm and a length of 120 mm was used. The number of the test pieces was three pieces taken from sample 3 along the warp direction and three pieces taken from sample 3 along the weft direction. In the test piece, the first fibrous base material 20 and the second fibrous base material 30 were separated by 40 mm from one end side in the long side direction along the long side direction. The one end side in the long side direction coincides with the side of one short side of the two short sides of the test piece.

The test piece was attached, with the separated portion of the first fibrous base material 20 and the separated portion of the second fibrous base material 30, to a pair of grippers of the tensile tester in a state where the test piece had no slack and no tension was applied. The measurement conditions were as follows.

[Measurement Conditions]
Gripping width: 30 mm
Pulling speed: 200 mm/minute

The average value of the values obtained by dividing each three maximum load obtained from the three test pieces taken along the warp direction as the measurement targets by the gripping width was defined as the peeling strength in the warp direction of sample 3. The average value of the values obtained by dividing each three maximum load obtained from the three test pieces taken along the weft direction as the measurement targets by the gripping width was defined as the peeling strength in the weft direction of sample 3.

(4-3) Breaking Strength and Elongation

For the measurement of breaking strength and elongation, a rectangular test piece having a width of 50 mm and a length of 250 mm was used. The number of test pieces was five pieces taken from sample 3 along the warp direction and five pieces taken from sample 3 along the weft direction. On the test piece, two gauge points were set at the center of the long side direction at intervals of 100 mm.

The test piece was attached to a pair of grippers of the tensile tester at both ends in the long side direction in a state where the test piece had no slack and no tension was applied. The measurement conditions were as follows.

[Measurement Conditions]
Gripping width: 50 mm
Pulling speed: 200 mm/minute

The average value of the values obtained by dividing each five maximum load obtained from the five test pieces taken along the warp direction as the measurement targets by the gripping width was defined as the breaking strength in the warp direction of sample 3. The average value of the five elongations obtained by expression (2) from each of the five test pieces taken along the warp direction was defined as the elongation in the warp direction of sample 3. The average value of the values obtained by dividing each five maximum load obtained from the five test pieces taken along the weft direction as the measurement targets by the gripping width was defined as the breaking strength in the weft direction of sample 3. The average value of the five elongations obtained by expression (2) from each of the five test pieces taken along the weft direction was defined as the elongation in the weft direction of sample 3.

$$\text{Elongation } (\%) = (L_1 - L_0)/L_0 \times 100 \quad (2)$$

$L_0$: Distance between gauges before test (mm)
$L_1$: Distance between gauges at break (mm)

(5) Total Aperture Ratio

In the above, the description of the total aperture ratio was omitted. Therefore, prior to the description of the method of measuring the total aperture ratio, the total aperture ratio will be described. In the skin material 10 in which the plurality of through holes 22 are provided to the first fibrous base material 20 and the second fibrous base material 30 is a knitted fabric, the through holes 22 and the gaps between the knitted fabric communicate in the laminating direction. The skin material 10 includes a plurality of continuous holes penetrating the skin material 10 in the laminating direction. Therefore, the skin material 10 has air permeability. The total aperture ratio is a ratio of the total area of the continuous holes to the unit area. The total area of the continuous holes is a sum of the opening areas of all the continuous holes existing in the unit area of the skin material 10.

The measurement target for the total aperture ratio was sample 3. For the measurement of the total aperture ratio, a rectangular test piece having a width of 20 mm and a length of 20 mm was used. The number of test pieces was five pieces continuously taken from sample 3 along the warp direction and five pieces continuously taken from sample 3 along the weft direction.

The apparatus for measuring the total aperture ratio includes an image processing system, a camera, and a transmissive illumination pedestal. The camera was provided on the transmissive illumination pedestal. The image processing system was a multi-camera image system/line scan camera compatible controller (XG-8700L) manufactured by Keyence© Corporation. The camera was a 21 million pixel camera (CA-H2100M) manufactured by Keyence® Corporation. The transmissive illumination pedestal was a high-luminance surface illumination (TMW100×300-32WD-4) manufactured by AITEC System Co., Ltd. The capture resolution was set at 7.4 μm/pixel.

A reference film was used for calibration of the measuring apparatus. The reference film includes a plurality of 1.3 mm diameter black dots formed at 5 mm intervals. The calibration of the measuring apparatus was as follows. That is, the calibration of the measuring apparatus was based on a state where 32 black dots were included in the photographed image. Then, this calibration was performed by adjusting the light amount of the transmissive illumination pedestal and the diaphragm of the camera so that the following ratio would be 93.59±0.01%. The previously described ratio is a percentage obtained by dividing the total area of 32 black dots by the following area. The previously described area is a sum of the total area of the 32 black dots and the area of the region including the 32 black dots in which the black dots are excluded. The previously described area is also the area of the photographing range of the photographed image.

The measurement of the total aperture ratio includes the following first procedure, second procedure, third procedure and fourth procedure. In the first procedure, the test piece is placed on the transmissive illumination pedestal, and then a glass plate is placed on the test piece. The test piece is flattened by the glass plate on the transmissive illumination pedestal. The test piece is placed on a position of the transmissive illumination pedestal facing the camera. In the second procedure, the test piece is photographed by the camera. Accordingly, image data corresponding to the photographed image is obtained. This image data is taken into the image processing system.

The third procedure is performed by the image processing system. The image processing system binarizes the image data. In the image data after the binarization, a first region of the test piece is white, and a second region of the test piece is black. The first region is a region of the test piece through which light from the transmissive illumination pedestal has passed. The first region corresponds to a region of the test piece where the above-described continuous holes exist. The second region is a region of the test piece through which light from the transmissive illumination pedestal does not pass. The second region corresponds to a region of the test piece where the above-described continuous holes do not exist. The image processing system acquires the area of the first region and the area of the second region, and outputs both areas of the first region and the second region. In the fourth procedure, the total aperture ratio is obtained for each of the ten test pieces according to the following expression (3).

Total aperture ratio (%)=Area of first region/(Area of first region+Area of second region)×100     (3)

The average value of the following ten total aperture ratios was defined as the total aperture ratio of sample 3. Five of the ten total aperture ratios previously described are the five total aperture ratios obtained by the expression (3) from each of the five test pieces taken along the warp direction. The remaining five of the ten total aperture ratios previously described are the five total aperture ratios obtained by the expression (3) from each of the five test pieces taken along the weft direction.

<Experimental Result>

(1) Appearance Observation

In the following first and second cases, the colored geometric pattern on the front face of the second fibrous base material 30 could be visually recognized through the through holes 22 in all of the samples 1 to 3. The first case is a case in which the front faces of the samples 1 to 3 are viewed straight from the front side in the laminating direction. The second case is a case in which the front faces of the samples 1 to 3 are viewed obliquely from the front side in the laminating direction. In the second case, a three-dimensional impression could be felt from the combination of a wall surfaces of the through holes 22 and the colored geometric pattern on the front face of the second fibrous base material 30 (in particular, see "Sample 2" shown in the middle row of FIG. 4).

(2) ΔE*ab

In samples 1 to 3, the measurement results of L*, a*, and b* of the front faces of the first fibrous base material 20 and the second fibrous base material 30 were as shown in Table 1. In sample 1, ΔE*ab of the red color of the front face of the first fibrous base material 20 was set to 1.2 or more in all the white region, the red region and the black region of the front face of the second fibrous base material 30. In sample 2, ΔE*ab of the dark gray color of the front face of the first fibrous base material 20 was set to 1.2 or more in all the white region, the red region and the black region of the front face of the second fibrous base material 30. In sample 3, ΔE*ab of the gray color of the front face of the first fibrous base material 20 was set to 1.2 or more in all the white region, the gray region and the black region of the front face of the second fibrous base material 30. In Table 1, ΔL* indicates an absolute value of the difference between L* of the first fibrous base material 20 and L* of the second fibrous base material 30, and Δa* indicates an absolute value of the difference between a* of the first fibrous base material 20 and a* of the second fibrous base material 30, and Δb* indicates an absolute value of the difference between b* of the first fibrous base material 20 and b* of the second fibrous base material 30.

TABLE 1

| SAMPLE | FIBROUS BASE MATERIAL | | L* | a* | b* |
| --- | --- | --- | --- | --- | --- |
| 1 | FIRST FIBROUS BASE MATERIAL | | 35.51 | 33.95 | 16.92 |
| | SECOND FIBROUS BASE MATERIAL | WHITE REGION | 80.89 | −0.13 | 0.03 |
| | | RED REGION | 48.07 | 53.96 | 25.80 |
| | | BLACK REGION | 22.64 | 0.22 | −1.10 |
| 2 | FIRST FIBROUS BASE MATERIAL | | 26.13 | 0.06 | −1.11 |
| | SECOND FIBROUS BASE MATERIAL | WHITE REGION | 72.30 | 1.33 | 0.26 |
| | | RED REGION | 48.27 | 54.63 | 27.04 |
| | | BLACK REGION | 22.37 | 0.20 | −0.91 |
| 3 | FIRST FIBROUS BASE MATERIAL | | 46.19 | −0.29 | −0.52 |
| | SECOND FIBROUS BASE MATERIAL | WHITE REGION | 81.68 | −0.41 | −0.24 |
| | | GRAY REGION | 67.75 | 0.90 | −0.82 |
| | | BLACK REGION | 22.12 | 0.11 | −1.08 |

| SAMPLE | SECOND FIBROUS BASE MATERIAL | ΔL* | Δa* | Δb* | ΔE*ab |
| --- | --- | --- | --- | --- | --- |
| 1 | WHITE REGION | 45.38 | 34.08 | 16.89 | 59.22 |
| | RED REGION | 12.56 | 20.01 | 8.88 | 25.24 |
| | BLACK REGION | 12.87 | 33.72 | 18.02 | 40.34 |
| 2 | WHITE REGION | 46.16 | 1.28 | 1.37 | 46.20 |
| | RED REGION | 22.14 | 54.57 | 28.15 | 65.27 |
| | BLACK REGION | 3.76 | 0.15 | 0.20 | 3.77 |

TABLE 1-continued

| | | | | | |
|---|---|---|---|---|---|
| 3 | WHITE REGION | 35.49 | 0.12 | 0.28 | 35.49 |
| | GRAY REGION | 21.55 | 1.19 | 0.30 | 21.59 |
| | BLACK REGION | 24.07 | 0.40 | 0.56 | 24.08 |

(3) Mechanical Strength

The mechanical strength of sample 3 was as follows.

[Tear Strength]

Warp direction: 75 N

Weft direction: 91 N

[Peeling strength]

Warp direction: 2.74 kgf/cm

Weft direction: 3.32 kgf/cm

[Breaking strength and elongation]

Warp direction: 117.8 N/cm, 84.8%

Weft direction: 110.4 N/cm, 64.1%

(4) Total Aperture Ratio

The total aperture ratio of sample 3 was 14.3%. In this case, the air permeability becomes 430 mm$^3$/mm$^2$s. The measurement of the air permeability was carried out conforming to JIS L1913: 2010 6.8.1 (Frazier method).

<Effects of the Embodiment>

According to the embodiment, the following effects can be obtained.

(1) The skin material 10 includes the first fibrous base material 20 and the second fibrous base material 30 (see FIG. 1). The first fibrous base material 20 has the first color front face. The second fibrous base material 30 has the front face of the second color different from the first color. The second fibrous base material 30 is laminated on the back face of the first fibrous base material 20. The first fibrous base material 20 has the through holes 22. The through holes 22 penetrate the first fibrous base material 20 in the laminating direction. The dimension of the through hole 22 in the first direction is set to the first value N1. The dimension of the through hole 22 in the second direction is set to the second value N2. The dimension of the through hole 22 in the laminating direction is set to the third value N3. The first value N1 is set to be 0.38 times or more and 12 times or less with respect to the third value N3. The second value N2 is set to be 0.38 times or more and 12 times or less with respect to the third value N3. Furthermore, the second value N2 is set equal to the first value N1.

Therefore, portions of the front face of the second fibrous base material 30 that overlaps with the through holes 22 can be exposed on the front face of the skin material 10 (see upper row and middle row of FIG. 4). A person who sees the front face of the skin material 10 can visually recognize the previously described portions on the front face of the second fibrous base material 30. The skin material 10 having excellent design properties can be obtained.

(2) For the second color, ΔE*ab in the L*a*b* color system with the first color is set to 1.2 or more. Therefore, a person who sees the front face of the skin material 10 can perceive the color difference between the front face of the first fibrous base material 20 and the front face of the second fibrous base material 30 through the through holes 22 (see upper row and middle row of FIG. 4).

(3) The skin material 10 includes the plurality of continuous holes penetrating the skin material 10 in the laminating direction. Therefore, the skin material 10 has air permeability. The skin material 10 can be employed as a skin material for a ventilation seat.

In the skin material 10, the total aperture ratio is preferably set to a predetermined value in the range of 0.01 to 9.26%. More preferably, the total aperture ratio is set to a predetermined value in the range of 1.67 to 5.43%. By setting the total aperture ratio to 0.01% or more, the front face of the second fibrous base material 30 can be easily visually recognized from the through holes 22. The design properties of the skin material 10 can be enhanced. By setting the total opening ratio to 9.26% or less, the durability of the skin material 10 can be improved, and the tear strength of the skin material 10 can be increased. Further, the peeling strength between the first fibrous base material 20 and the second fibrous base material 30 can be ensured.

<Modified Example>

The embodiment can also be as follows. Some of the configurations of the modifications described below may be appropriately combined and employed. Hereinafter, points different from the above description will be described, and the description of the same points will be appropriately omitted.

(1) The method for manufacturing the skin material 10 includes the first step and the second step. The first step is a step of applying the adhesive. For example, the adhesive is applied to the back surface of the first fibrous base material 20. The second step is a step of attaching the first fibrous base material 20 and the second fibrous base material 30. The manufacturing method may include a third step. The third step is a step of performing a known wet heat treatment. The wet heat treatment accelerates the curing reaction of the adhesive.

(2) The pattern recorded on one or both front faces of the first fibrous base material 20 and the second fibrous base material 30 includes various patterns. Therefore, when measuring L*, a* and b* of the front face of the first fibrous base material 20 or the second fibrous base material 30 using a spectrophotometer, the measurement range is not a single color, but may also include a plurality of colors. For example, when elements forming the pattern is in a fine aspect, the measurement range is likely to include a plurality of colors. In this case, L*, a* and b* of the front face of the first fibrous base material 20 may be an average value of each of the four L*, a* and b* obtained by measuring four arbitrary points on the front face of the first fibrous base material 20 in the same manner as in the above-described Example. L*, a* and b* of the front face of the second fibrous base material 30 may not be the average values of each of the four L*, a* and b* obtained by the measurement for each color region, but may be an average value of each of the four L*, a* and b* obtained by measuring four arbitrary points on the front face of the second fibrous base material 30 as in the case of the first fibrous base material 20 of the Example described above. ΔE*ab is obtained from ΔL*, Δa* and Δb*, which are the differences between L*, a* and b* of the front face of the first fibrous base material 20 and L*, a* and b* of the front face of the second fibrous base material 30 obtained as described above, based on the above-described expression (1).

DESCRIPTION OF REFERENCE SIGNS

10 Skin material

20 First fibrous base material

22 Through hole
30 Second fibrous base material
N1 First value
N2 Second value
N3 Third value
Θ Inclination angle

The invention claimed is:

1. A skin material comprising:
a first fibrous base material with a front face and a back face, the front face being a first color, and
a second fibrous base material with a front face that is a second color different from the first color and is laminated on the back face of the first fibrous base material,
wherein the first fibrous base material has a through hole penetrating the first fibrous base material in a laminating direction of the first fibrous base material and the second fibrous base material,
wherein a maximum dimension of the through hole in a first direction orthogonal to the laminating direction is set to a first value,
wherein a maximum dimension of the through hole in a second direction orthogonal to both the laminating direction and the first direction is set to a second value,
wherein a maximum dimension of the through hole in the laminating direction is set to a third value,
wherein the first value is set to be 0.38 times or more and 12 times or less with respect to the third value,
wherein the second value is set to be 0.38 times or more and 12 times or less with respect to the third value,
wherein the front face of the second color of the second fibrous base material includes, in a portion overlapping the through hole, a first colored region having a third color as the second color different from the first color, and a second colored region having a fourth color as the second color different from the first color and the third color.

2. The skin material according to claim 1, wherein the second value is set equal to the first value.

3. The skin material according to claim 2, wherein when the first color and the second color are defined in an L*a*b* color system, a ΔE*ab value of the second color relative to the first color is set to 1.2 or more.

4. The skin material according to claim 3, wherein, the first fibrous base material has a first through hole and a second through hole as the through hole,
wherein the front face of the second color of the second fibrous base material includes:
the first colored region in a portion overlapping the first through hole, and
the second colored region in a portion overlapping the second through hole.

5. The skin material according to claim 2, wherein, the first fibrous base material has a first through hole and a second through hole as the through hole,
wherein the front face of the second color of the second fibrous base material includes:
the first colored region in a portion overlapping the first through hole, and
the second colored region in a portion overlapping the second through hole.

6. The skin material according to claim 1, wherein when the first color and the second color are defined in an L*a*b* color system, a ΔE*ab value of the second color relative to the first color is set to 1.2 or more.

7. The skin material according to claim 6, wherein, the first fibrous base material has a first through hole and a second through hole as the through hole,
wherein the front face of the second color of the second fibrous base material includes:
the first colored region in a portion overlapping the first through hole, and
the second colored region in a portion overlapping the second through hole.

8. The skin material according to claim 1, wherein, the first fibrous base material has a first through hole and a second through hole as the through hole,
wherein the front face of the second color of the second fibrous base material includes:
the first colored region in a portion overlapping the first through hole, and
the second colored region in a portion overlapping the second through hole.

9. The skin material according to claim 1, wherein the first value is set to be 0.66 times or more and 2.5 times or less with respect to the third value, and wherein the second value is set to be 0.66 times or more and 2.5 times or less with respect to the third value.

10. The skin material according to claim 1, wherein the second fibrous base material has a density in a range from 25 wale/25.4 mm to 55 wale/25.4 mm.

11. The skin material according to claim 1, further comprising a plurality of continuous holes penetrating the first fibrous base material and the second fibrous base material.

12. The skin material according to claim 11, wherein the plurality of continuous holes combined have a first area in a plane through the front face of the second fibrous base material, a ratio between the first area and a second area defined by an entirety of the front face of the second fibrous base material being in a range from 0.01% to 9.26%.

13. The skin material according to claim 1, wherein a border is discernable between the first colored region and the second colored region.

14. The skin material according to claim 1, wherein the second fibrous base material has an aperture ratio in a range from 0.47% to 80.63%.

15. The skin material according to claim 1, wherein the first fibrous base material includes a plurality of holes, the plurality of holes combined having a first area in a plane through the front face of the first fibrous base material, a ratio of the first area to a second area defined by an entirety of the front face of the first fibrous base material being in a range from 2.77% to 14.26%.

* * * * *